United States Patent [19]

Neil

[11] 3,776,681
[45] Dec. 4, 1973

[54] THERMOFORMING APPARATUS
[75] Inventor: Peter C. Neil, Fullerton, Calif.
[73] Assignee: Standard Oil Company, Chicago, Ill.
[22] Filed: Apr. 27, 1971
[21] Appl. No.: 137,941

[52] U.S. Cl.................. 425/346, 425/385, 425/450
[51] Int. Cl. ............................................. B29c 3/04
[58] Field of Search............... 425/346, 429–432, 425/335, 344, 385, 383, 398, 406, 408, 411, 424, 450

[56] References Cited
UNITED STATES PATENTS

| 3,346,923 | 10/1967 | Brown et al. ........................ 425/162 |
| 3,359,600 | 12/1967 | O'Brien et al. ...................... 425/157 |
| 3,376,607 | 4/1968 | Brown............................. 425/398 X |
| 3,611,500 | 10/1971 | Carrigan et al. ................. 425/408 X |
| 3,189,399 | 6/1965 | Jacobs et al. ....................... 425/157 |

Primary Examiner—Robert L. Spicer, Jr.
Attorney—Arthur G. Gilkes, William T. McClain and John J. Connors

[57] ABSTRACT

Disclosed is a thermoforming apparatus including a mold assembly wherein the mold sections of the assembly are moved relative to each other in accordance with a harmonic pattern of movement, and a film advancing assembly that moves the film intermittently in accordance with a harmonic pattern of movement.

5 Claims, 8 Drawing Figures

PATENTED DEC 4 1973      3,776,681

INVENTOR
PETER C. NEIL
BY John J. Connors
ATTORNEY

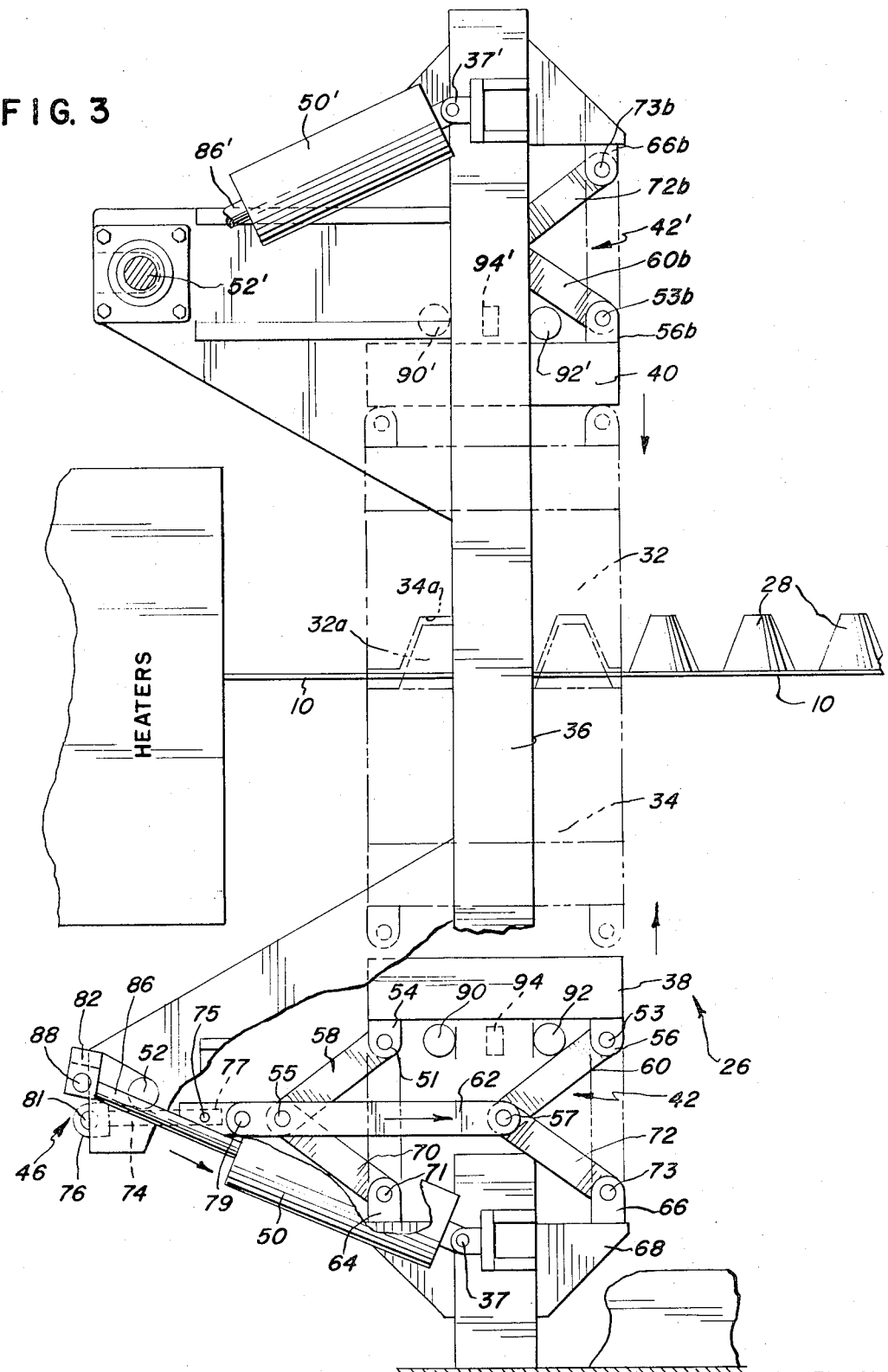

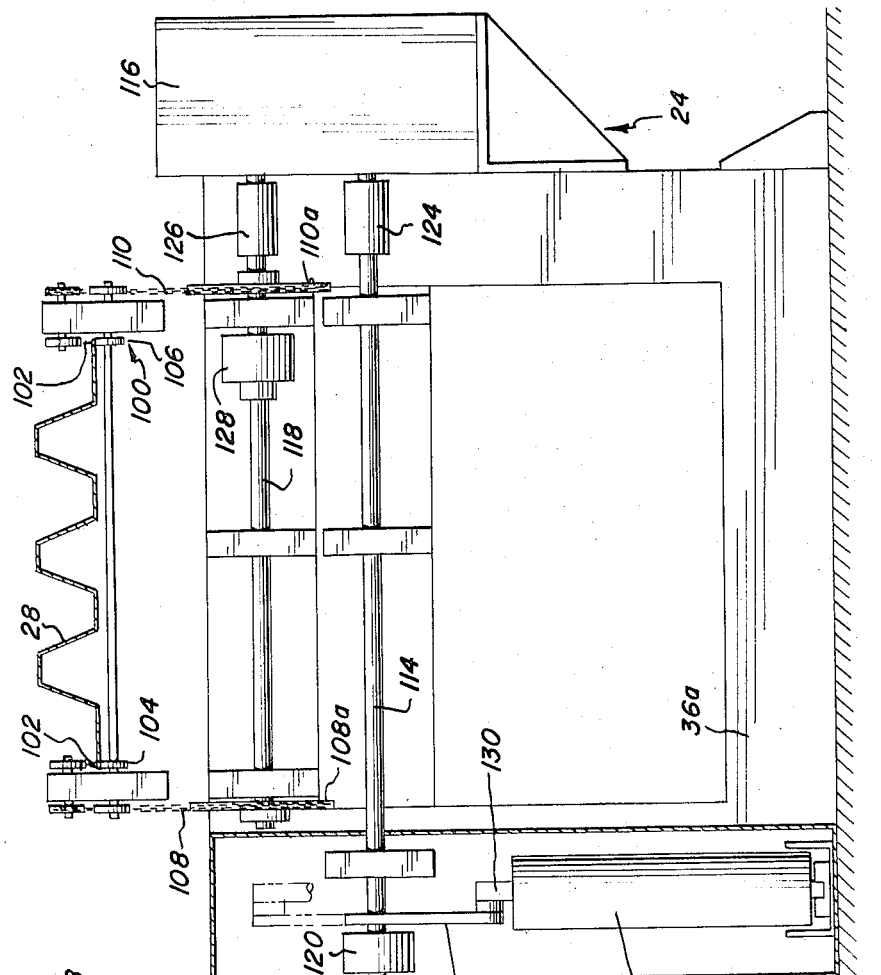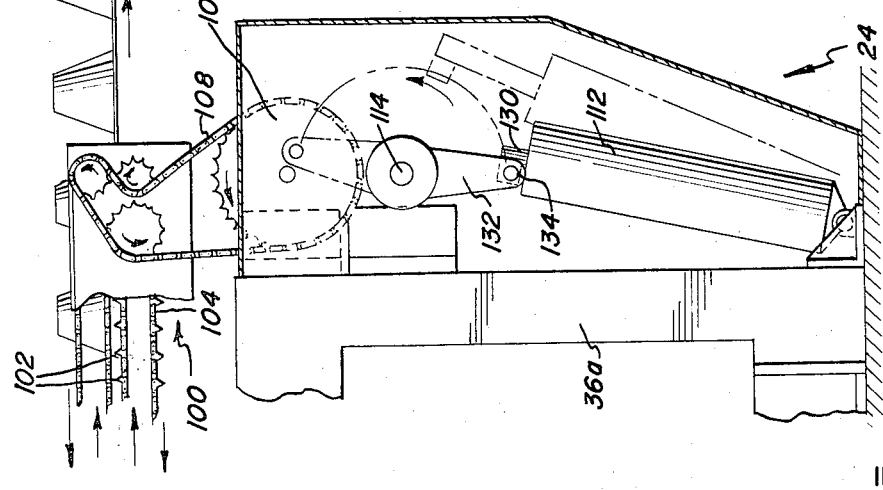

THERMOFORMING APPARATUS

BACKGROUND

In the thermoforming art a hot, thin film of thermoplastic material is moved between a pair of spaced mold sections and stopped momentarily while the mold sections are brought together to form an article of manufacture in the film. In conventional apparatus the mold sections, after overcoming inertia, accelerate rapidly as they move toward each other and then decelerate abruptly, clamping the film between them to form in the film articles of manufacture. The mold sections are then disengaged in a similar manner, and the film with the articles formed therein is advanced a predetermined distance, accelerated rapidly as it initiates its path of travel, and then decelerated abruptly. This intermittent film movement advances more hot film between the mold sections so that the apparatus is ready to go through another thermoforming cycle. Rapid acceleration and deceleration of the mold sections and the film is detrimental because the mold sections tend to become misaligned and damaged, and ripples tend to form in the film. Such ripples can sometimes be observed in the articles being made and detract from the articles' appearance. It is the objective of my invention to eliminate or minimize these problems by employing apparatus which moves the mold sections and film in accordance with a harmonic pattern of movement. The following figures and accompanying description disclose the details of this apparatus.

DESCRIPTION OF DRAWINGS

FIG. 3 is a side elevational view, with sections broken away, showing the mold assembly.

FIG. 7 is a side elevational view of the film advancing assembly.

FIG. 8 is a front elevational view of the film advancing assembly.

DESCRIPTION OF PREFERRED EMBODIMENT

1. General

Figure 1:
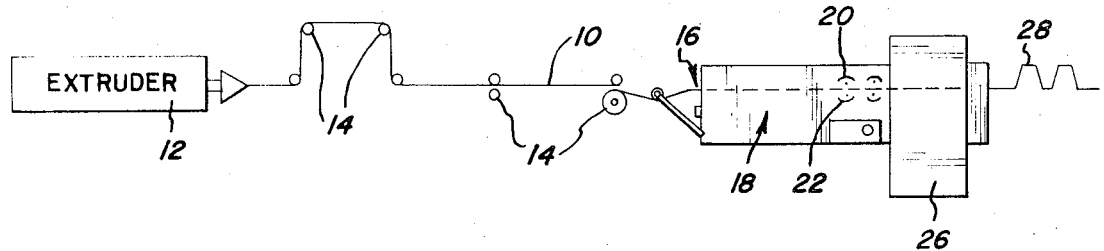
FIG. 1 is a schematic view showing a thin film of thermoplastic moving through the apparatus of my invention.

As shown in FIG. 1, a flat, thin film of thermoplastic material 10 leaves extruder 12 and moves around rollers 14 into entrance 16 of my thermoforming apparatus 18. This apparatus 18 includes, above and below the path of film 10, heaters 20 and 22 which heat film 10 so that it is pliable. Film advancing assembly 24, shown in FIGS. 7 and 8, moves hot pliable film 10 into mold assembly 26 (FIGS. 3–6) which forms articles of manufacture 28 in film 10. Film advancing assembly 24 moves film 10 intermittently and horizontally through apparatus 18, so that the film is stopped momentarily during formation of the articles of manufacture. The film is then advanced to exit 30 where it leaves apparatus 18.

Figure 2:
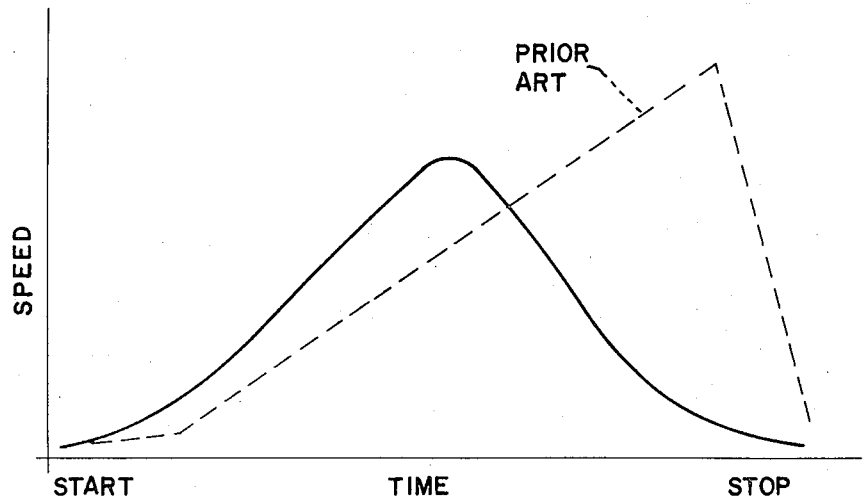
FIG. 2 is a graph schematically illustrating harmonic and nonharmonic patterns of movement.
Figure 5:
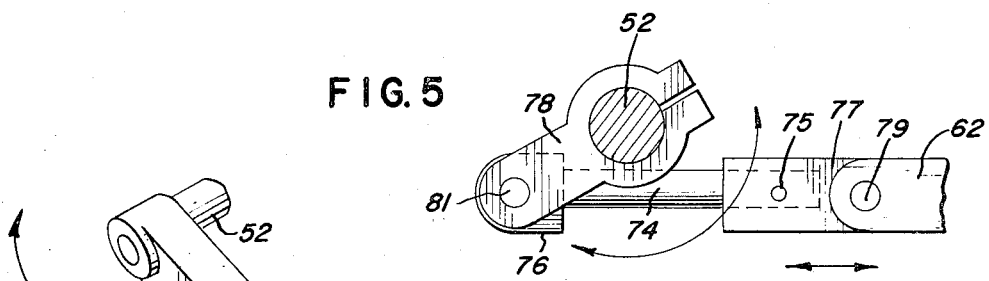
FIG. 5 is an enlarged view of the toggle linkage actuating mechanism.
Figure 6:
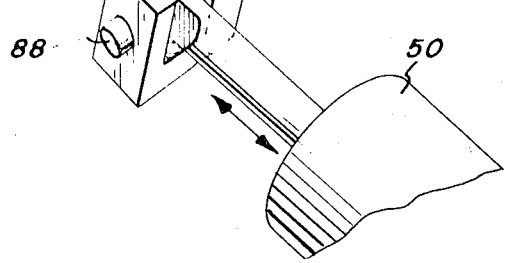
FIG. 6 is an enlarged view of the torque tube linkage actuating mechanism.
Figure 4:
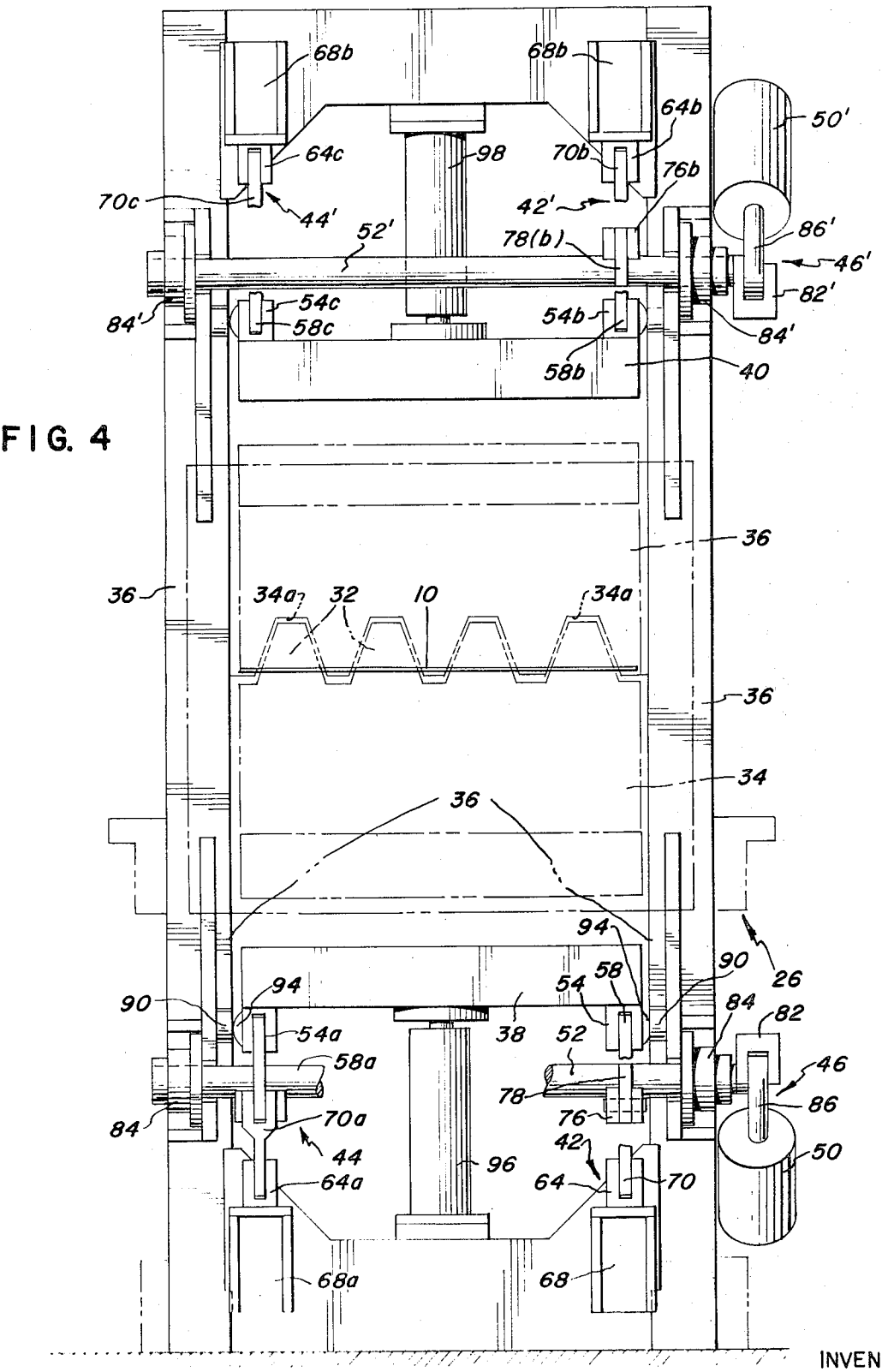
FIG. 4 is a rear elevation view, with sections broken away, showing the mold assembly.

According to one feature of my invention, mold sections 32 and 34 (FIG. 3) of mold assembly 26 are moved toward and away from each other in accordance with a harmonic pattern of movement. Such harmonic movement is schematically illustrated in FIG. 2 by the curved solid line. Prior art non-harmonic movement is shown in dotted lines. Mold sections 32 and 34, when moving according to a harmonic pattern, accelerate gently moving toward each other, reaching a maximum speed when they are about mid-way along their path of travel. At this mid-way point they begin to decelerate gradually until they come to a slow, gentle stop. According to the prior art the mold sections move toward each other initially very slowly as inertia is overcome, and then at a more or less constant rate of acceleration until they reach a maximum velocity just before they engage one another. Then they come to a quick, jerky stop. Such non-harmonic movement causes the mold sections to slam together, misaligning and damaging them.

According to another feature of my invention, film advancing assembly 24 moves film 10 in accordance with a harmonic pattern of movement. In other words, film 10 accelerates gently, reaching a peak of acceleration about mid-way along its path of travel, and then it decelerates gently until it comes to a slow stop. Such movement of film 10 is also schematically illustrated by the solid curve of FIG. 2. Since film 10 is hot, if it is accelerated or decelerated rapidly, the internal momentum of the film as it abruptly starts and stops will cause the formation of ripples in the film. Such ripples can spoil the appearance of the articles of manufacture being made. Harmonic movement of the film through apparatus 18 eliminates or minimizes ripple formation and permits more film to be processed in less time than heretofore.

2. Mold Assembly

As shown in FIGS. 3–6, mold assembly 26 of my apparatus includes machine frame 36 to which is attached movably mounted upper and lower mold sections 32 and 34. These sections 32 and 34 are respectively mounted to upper and lower platens 38 and 40.

Lower platen 38, through toggle linkages 42 and 44 and torque tube linkage 46, is connected to air cylinder 50 pivotally attached to frame 36 at 37. Torque tube 52 connects toggle linkages 42 and 44, and when torque tube 52 rotates it initiates movement of toggle linkages 42 and 44. Thus, linkages 42 and 44 move in unison. This is important to maximize synchronization. Upper platen 40 has similar toggle and torque tube linkages, torque tube, and air cylinder. Like parts are given the same numerals and a prime superscript.

Lower toggle linkage 42 includes spaced clevises 54 and 56 attached to platen 38, and arms 58 and 60 pivotally connected by pins 51 and 53 to clevises 54 and 56, respectively. Arms 58 and 60 are also pivotally connected by pins 55 and 57, respectively, to double bar 62. Linkage 42 also includes spaced clevises 64 and 66 attached to support 68 attached to frame 36. Arms 70 and 72 are pivotally connected by pins 71 and 73 to clevises 64 and 66, respectively. These arms 70 and 72 are also connected to bar 62, respectively, by pins 55 and 57. Arm 74 is attached by rod 75 to clevis 77, and pin 79 extends through clevis 77 and bar 62, pivotally connecting this clevis to the bar. Arm 74 is also connected to another clevis 76, which in turn is connected to torque tube 52 to arm 78. One end of arm 78 is rotatably attached to clevis 76 by pin 81 and the other end of arm 78 is secured attached to torque tube 52. Lower toggle linkage 44 as well as upper toggle linkages 42' and 44' are similarly constructed, and like parts are given the same numerical designations and subscripts a, b and c for the linkages 44, 42' and 44', respectively.

Torque tube linkage 46 includes clevis 82 secured to torque tube 52. Torque tube 52 extends through frame 36 and is carried in bearings 84 so that it can rotate. Plunger 86 of air cylinder 50, pivotally connected by pin 88 to clevis 82, turns tube 52 when actuated. Upper torque tube linkage 46' is similarly constructed and like parts are designated by the same numerals and a prime superscript.

To lower platen 38, on each side of the platen, are rotatably connected guide rollrs 90, 92 and 94. Guide rollers 90 and 92 are straddle frame 36 and ride along the edges of the frame as platen 38 is moved vertically. Guide rollers 94 engage and ride on the inside face of frame 36. Upper platen is similarly constructed and includes guide rollers designated by the same numerals and a prime superscript. These guide rollers aid in maintaining the side to side alignment of the platens as they move vertically.

Air cylinder 96 is disposed between the inside of lower platen 38 and the bottom of frame 36, and air cylinder 98 is disposed between the inside of upper platen 40 and the top of frame 36. The bases of these cylinders 96 and 98 are connected, respectively, to the bottom and top of frame 36. These air cylinders 96 and 98 are charged with air after mold sections 32 and 34 have been brought together. This maintains the sections in a clamped position during thermoforming operations.

In operation, film 10 is moved between mold sections 32 and 34 and stopped momentarily. Air cylinders 50 and 50' are charged with air, causing plungers 86 and 86' to be pulled in. This turns clevises 82 and 82' which in turn causes torque tubes 52 and 52' to rotate. This actuates toggle linkages to move platens 38 and 40 toward each other in accordance with a harmonic pattern of movement. More specifically, I shall describe the harmonic movement of one toggle linkage which is essentially identical to the movement of all the toggle linkages.

As plunger 86 is pulled in it moves clevis 82 to the dotted position shown in FIG. 3. This causes torque tube 52 to rotate counter-clockwise, turning arm 78 (FIGS. 5 and 6) so that it moves to the right clevis 76, arm 74, clevis 77 and double bar 62. Clevis 77 pivots about pin 79 as it moves to the right, arms 58 and 70 pivot about pin 55 as they move to an upright position, and arms 60 and 72 pivot about pin 57 as they move to an upright position. As arm 78 moves through a predetermined arc with the turning of tube 52, the upward vertical distance through which platen 38 moves varies for any given fixed interval of time. In other words, its speed varies. Initially it moves slowly. Then it speeds up, reaching a maximum when arm 78 is about midway through its arc of travel. Thereafter it slows down gradually and finally comes to a gentle stop. At this point, mold section 32 is fully raised. When mold section 32 is to be lowered, plunger 86 is moved outwardly from cylinder 50, reversing the direction of movement of toggle linkage 42 with the clockwise movement of torque tube 52. Upper platen 40 is moved in a similar manner downwardly toward film 10.

Because of this harmonic movement of mold sections 32 and 34, the sections are not slammed together and plug assists 32a, moving into mold cavities 34a, penetrate film 10 in a uniform manner. This provides an article of manufacture of improved quality and greater uniformity of wall thickness.

3. Film Advancing Assembly

As shown in FIGS. 7 and 8, film advancing assembly 24 of my apparatus includes a conventional film transporting sub-assembly 100 such as disclosed in U.S. Pat. No. 3,513,505. This sub-assembly 100 includes piercer elements 102 attached to endless conveyors 104 and 106 at the lateral extremities of film 10. Piercer elements 102 impale film 10 and hold it as the film moves through apparatus 18. These conveyors 104 and 106 are driven by sprocket and chains means 108 and 110 respectively. Air cylinder 112 provides, through shaft 114, variable output gear box 116 and shaft 118 the motive force for sprocket and chains means 108 and 110. Shaft 114, mounted to rotate in machine frame 36a, has at one end a single direction clutch 120 and brake 122, and at the other end coupling 124 which couples the shaft to the input of gear box 116. The output of gear box 116 is connected through coupling 126 and single direction clutch 128 to shaft 118. Air cylinder 112 is pivotally connected at its lower end to the bottom of frame 36a, and plunger 130 of the cylinder is connected through arm 132 and single direction clutch 120 to shaft 114. Pin 134 pivotally connects one end of arm 132 to plunger 130, and the other end of this arm is coupled to clutch 120. Sprockets 108a and 110a are connected to shaft 118 so they turn when shaft 118 turns.

In operation, air cylinder 112 is charged with air causing plunger 130 to begin its upstroke. This causes cylinder 112 to pivot, moving to the position shown in dotted lines in FIG. 7. Arm 132, rotated counter-clockwise as viewed in FIG. 7 as plunger 130 moves outwardly, turns through clutch 120 shaft 114 in a counter-clockwise direction. This movement of shaft 114 is transmitted through gear box 116, causing shaft 118 to rotate counter-clockwise, which in turn causes sprocket and chains means 108 and 110 to advance conveyors 104 and 106. Thus film 10 exits apparatus 18. On the downstroke of plunger 130, arm 132 and cylinder 112 are returned to the position shown in solid line in FIG. 7. Single direction clutches 120 and 128 prevent shafts 114 and 118, respectively, from turning on the downstroke. Brake 122, electrically actuated any time after the start of the upstroke of plunger 130 but not coupled to shaft 114 until the plunger's downstroke, positively stops advancement of film 10. This prevents the momentum of film 10 from carrying the film past the proper alignment position in mold assembly 26. On the downstroke, mold assembly 26 moves mold sections 32 and 34 together to form articles in film 10.

Film advancing assembly 24 moves film 10 in accordance with a harmonic pattern of movement, gently initiating acceleration and deceleration of the film. A jarring start or stop of the hot film would cause ripples to develop in film 10 because it is hot. The harmonic movement of film 10 through the apparatus eliminates this problem so that the consistency and thickness of the film remains substantially uniform. Moreover, my film advancing assembly 24 can process about twice as much film as conventional apparatus.

I claim:

1. In a thermoforming apparatus for forming an article of manufacture in a thin film of plastic,
   means for moving the film along a predetermined path through the apparatus,
   first and second mold sections on opposite sides of said path, said mold sections movable relative to each other and aligned to engage the film when moved toward each other to form the article of manufacture in the film,
   means coupled to said first and second mold sections which move said sections toward and away from each other substantially in a harmonic pattern of movement and said film moving means move the film intermittently so that the film is at rest when the mold sections engage the film, said film moving means including means which cause the film to move substantially in a harmonic pattern of movement.

2. The apparatus of claim 1 wherein the film moving means moves the film along said path generally horizontally, and said first and second mold sections are moved toward and away from said film generally along a vertical path.

3. In a thermoforming apparatus for forming an article of manufacture in a thin film of plastic,
   means for moving the film along a predetermined path through the apparatus,
   first and second mold sections on opposite sides of said path, said mold sections movable relative to each other and aligned to engage the film when moved toward each other to form the article of manufacture in the film,
   each mold section including a pair of spaced toggle linkages which, when actuated, move said mold sections relative to each other substantially in a harmonic pattern of movement,
   means connecting each pair of linkages and each mold section so that said linkages move in unison,
   means for actuating said linkages and said film moving means moves the film intermittently so that the film is at rest when the mold sections engage the film, said film moving means including means which cause the film to move substantially in a harmonic pattern of movement.

4. The apparatus of claim 3 wherein the film moving means moves the film along said path generally horizontally, and said first and second mold sections are moved toward and away from said film generally along a vertical path.

5. In a thermoforming apparatus for forming an article of manufacture in a thin film of plastic,
   means for moving the film intermittently along a predetermined path through the apparatus, said film moving means including means which cause the film to move substantially in a harmonic pattern of movement,
   first and second mold sections on opposite sides of the path, said mold sections movable relative to each other and aligned to engage the film and move toward each other to form the article of manufacture in the film, and
   means coupled to the first and second mold sections which move said sections relative to each other.

* * * * *